(12) United States Patent
Kaneko et al.

(10) Patent No.: US 8,934,146 B2
(45) Date of Patent: Jan. 13, 2015

(54) IMAGE FORMING APPARATUS AND METHOD FOR PRINTING A REPORT WITH DIGITAL WATERMARK

(71) Applicant: Fuji Xerox Co., Ltd., Minato-ku, Tokyo (JP)

(72) Inventors: Yoshifumi Kaneko, Kanagawa (JP); Yoshihiro Takeshita, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 119 days.

(21) Appl. No.: 13/670,038

(22) Filed: Nov. 6, 2012

(65) Prior Publication Data
US 2013/0321874 A1     Dec. 5, 2013

(30) Foreign Application Priority Data
Jun. 5, 2012     (JP) ................................. 2012-127771

(51) Int. Cl.
*H04N 1/40*       (2006.01)
(52) U.S. Cl.
USPC .......... 358/3.28; 358/3.06; 358/450; 358/540
(58) Field of Classification Search
None
See application file for complete search history.

(56) References Cited

U.S. PATENT DOCUMENTS

| | | | | |
|---|---|---|---|---|
| 5,845,057 A | * | 12/1998 | Takeda et al. ................ | 358/1.15 |
| 7,283,758 B2 | * | 10/2007 | Murakami ..................... | 399/45 |
| 7,315,713 B2 | * | 1/2008 | Parry et al. .................... | 399/182 |
| 7,584,425 B2 | * | 9/2009 | Nader et al. ................... | 715/255 |
| 2005/0243354 A1 | * | 11/2005 | O'Neill ......................... | 358/1.13 |
| 2008/0082462 A1 | * | 4/2008 | Kamata .......................... | 705/408 |
| 2013/0320078 A1 | * | 12/2013 | Hobbs ........................... | 235/375 |

FOREIGN PATENT DOCUMENTS

| | | | | |
|---|---|---|---|---|
| JP | 7-312664 A | | 11/1995 | |
| JP | 2002-44299 A | | 2/2002 | |
| JP | 2007-147477 | * | 11/2005 | ............ G01N 35/00 |
| JP | 2009-291994 A | | 12/2009 | |

* cited by examiner

*Primary Examiner* — Dung Tran
(74) *Attorney, Agent, or Firm* — Sughrue Mion, PLLC

(57) ABSTRACT

An image forming apparatus includes a receiving unit, a dividing unit, and an output controller. The receiving unit receives an output instruction for a report. The dividing unit divides, when the output instruction for the report is received, report items to be output into a main-report item to be output as characters on a recording sheet and a sub-report item to be output as a digital watermark on the recording sheet in such a manner that the report items to be output are formed within a predetermined number of recording sheets or a predetermined number of pages. The output controller causes an output mechanism to output the main-report item as characters on the recording sheet and output the sub-report item as a digital watermark on the recording sheet, based on a division result by the dividing unit.

11 Claims, 11 Drawing Sheets

FIG. 5

| SELECTION SCREEN FOR THE NUMBER OF OUTPUT PAGES |
| --- |
| DO YOU WANT TO OUTPUT REPORT ITEMS FORMED WITHIN ONE PAGE?     YES    NO |

FIG. 6A

```
REPORT
━━━━━━━━━━━━━━━━
COPY SETTINGS
  COLOR MODE      BLACK AND
                  WHITE
  MAGNIFICATION   100 %
  SELECTION
        ⋮
  COPY DENSITY    NORMAL
                           P.1
```

```
REPORT
━━━━━━━━━━━━━━━━
PRINT SETTINGS
  TOTAL NUMBER    8000
  OF PAGES
  PDL             PDF
        ⋮
  TYPE OF         NORMAL
  PAPER           PAPER
                           P.2
```

⋮

```
REPORT
━━━━━━━━━━━━━━━━
SYSTEM SETTINGS
  DATE DISPLAY    MMDD
  FORMAT
  NORMAL END      SMALL
  SOUND
        ⋮
  ABNORMAL END    NO
  SOUND
                          P.10
```

```
REPORT
━━━━━━━━━━━━━━━━
COPY SETTINGS
  COLOR MODE      BLACK AND
                  WHITE
PRINT SETTINGS
  PDL             PDF
  TYPE OF PAPER   NORMAL PAPER
SYSTEM SETTINGS
  NORMAL END      SMALL
  SOUND
                           P.1
```

```
COPY SETTINGS
  MAGNIFICATION              100 %
PRINT SETTINGS
  TOTAL NUMBER OF PAGES      8000
SYSTEM SETTINGS
  DATE DISPLAY FORMAT        MMDD
  ABNORMAL END SOUND         NO
```

303

300

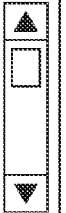

FIG. 11A

```
REPORT
━━━━━━━━━━━━━━━━━━━━
COPY SETTINGS
  COLOR MODE      BLACK AND
                  WHITE
  MAGNIFICATION   100 %
  SELECTION
      ⋮
  COPY DENSITY    NORMAL
              P.1
```

```
REPORT
━━━━━━━━━━━━━━━━━━━━
PRINT SETTINGS
  TOTAL NUMBER    8000
  OF PAGES
  PDL             PDF
      ⋮
  TYPE OF         NORMAL
  PAPER           PAPER
              P.2
```

⋮

```
REPORT
━━━━━━━━━━━━━━━━━━━━
SYSTEM SETTINGS
  DATE DISPLAY    MMDD
  FORMAT
  NORMAL END      SMALL
  SOUND
      ⋮
  ABNORMAL END    NO
  SOUND
              P.10
```

FIG. 11B

SELECT REPORT ITEM ⇒

```
                              WM
  ┌─────────────────────────┐
  │ REPORT                  │
  │━━━━━━━━━━━━━━━━━━━━━━━━│
  │ COPY SETTINGS           │
  │   COPY DENSITY   NORMAL │
  │                         │
  │ PRINT SETTINGS          │
  │   PDL            PDF    │
  │   TYPE OF PAPER  NORMAL PAPER │
  │                         │
  │ SYSTEM SETTINGS         │
  │   ABNORMAL END   NO     │
  │   SOUND                 │
  │             P.1         │
  └─────────────────────────┘
S  PAPER SIZE AND CHARACTER SIZE
       ARE NOT CHANGED
```

FIG. 11C

ENTER PAGE NUMBER ⇒

```
                              WM
  ┌─────────────────────────┐
  │ REPORT                  │
  │━━━━━━━━━━━━━━━━━━━━━━━━│
  │ COMMUNICATION SETTINGS  │
  │   PORT                  │
  │   ACTIVATION   INACTIVE │
  │   DOMAIN                │
  │   RESTRICTION  NO RESTRICTION │
  │      ⋮                  │
  │   PORT NUMBER   80      │
  │             P.8         │
  └─────────────────────────┘
S  PAPER SIZE AND CHARACTER SIZE
       ARE NOT CHANGED
```

IMAGE FORMING APPARATUS AND METHOD FOR PRINTING A REPORT WITH DIGITAL WATERMARK

CROSS-REFERENCE TO RELATED APPLICATIONS

This application is based on and claims priority under 35 USC 119 from Japanese Patent Application No. 2012-127771 filed Jun. 5, 2012.

BACKGROUND (i) Technical Field

The present invention relates to an image forming apparatus, an image forming method, and a computer readable medium.

(ii) Related Art

Image forming apparatuses having at least one image forming function, such as a facsimile function or a printing function, have been available. A report output function of outputting a report including items set in advance for an image forming apparatus has also been available. Items set in advance include, for example, a facsimile transmission destination, the size of printing paper, and the like. A user checks items of a report (hereinafter, referred to as report items) using a report output function to understand the contents set in an image forming apparatus.

In the case where many settings are done for the above-mentioned image forming apparatus, report items may not fall within one page and may be spread over plural pages. Thus, the number of pages to be output may increase. When the number of pages of the report increases, not only is it difficult for the user to find a report item that the user wants to check, but a page in which a report item not to be checked is printed is useless. Disposing of the useless page is a waste of paper resources.

SUMMARY

According to an aspect of the invention, there is provided an image forming apparatus including a receiving unit, a dividing unit, and an output controller. The receiving unit receives an output instruction for a report. The dividing unit divides, when the output instruction for the report is received, report items to be output into a main-report item to be output as characters on a recording sheet and a sub-report item to be output as a digital watermark on the recording sheet in such a manner that the report items to be output are formed within a predetermined number of recording sheets or a predetermined number of pages. The output controller causes an output mechanism to output the main-report item as characters on the recording sheet and output the sub-report item as a digital watermark on the recording sheet, based on a division result by the dividing unit.

BRIEF DESCRIPTION OF THE DRAWINGS

Exemplary embodiments of the present invention will be described in detail based on the following figures, wherein:

FIG. 5 illustrates an example of an operation screen displayed on an operation panel;

FIGS. 6A to 6C are diagrams for explaining a report output in the case where sub-report items fall within one page;

FIGS. 9A to 9C illustrate another example of the operation screen displayed on the operation panel;

FIGS. 11A to 11C are diagrams for explaining a report output in a second exemplary embodiment.

DETAILED DESCRIPTION

Hereinafter, exemplary embodiments of the invention will be described with reference to the drawings.

First Exemplary Embodiment

Figure 1:
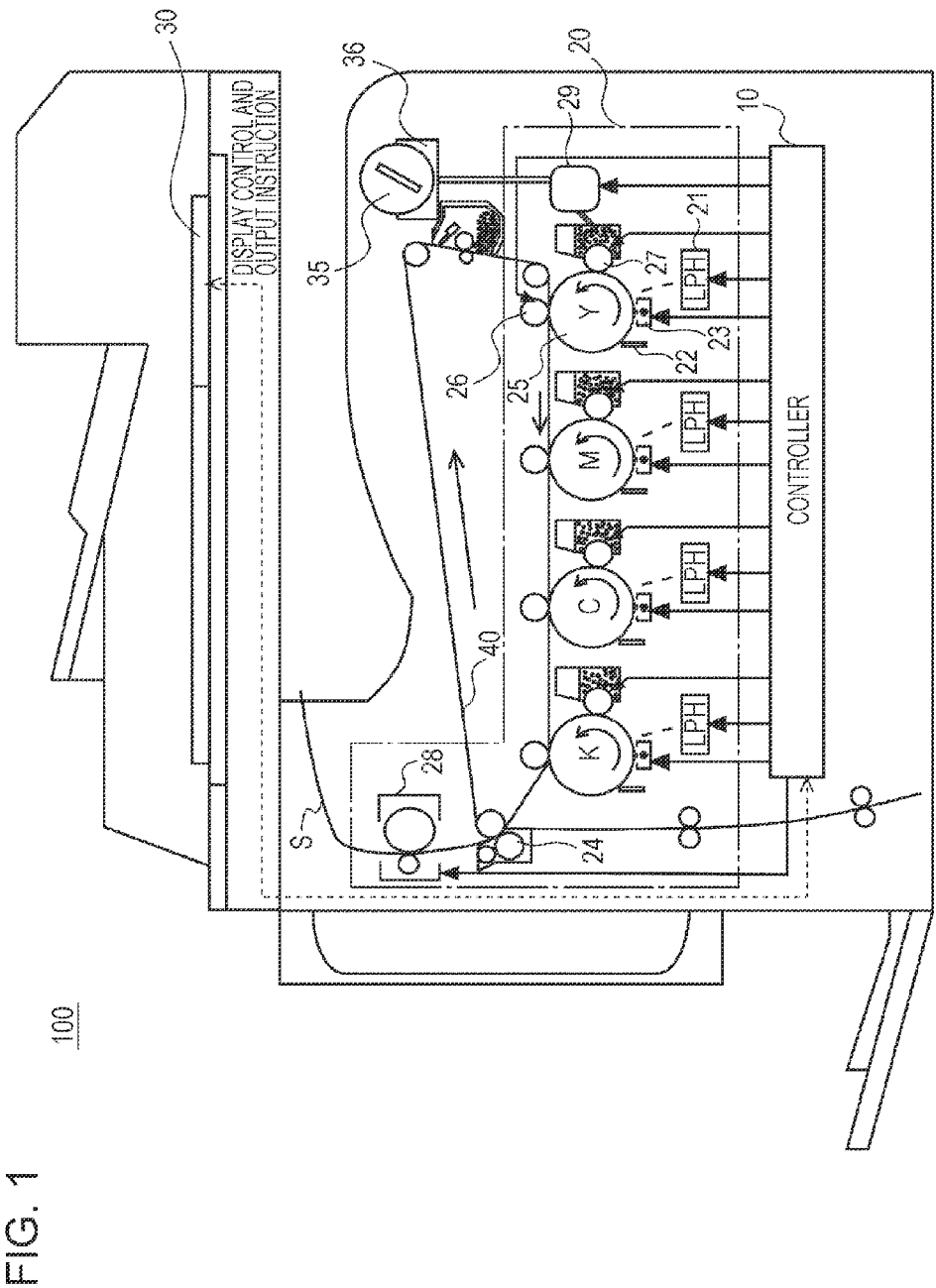
FIG. 1 illustrates an example of the configuration of principal parts of an image forming apparatus.

FIG. 1 illustrates an example of principal parts of an image forming apparatus 100. The image forming apparatus 100 has at least one image forming function, such as a copying function, a scanner function, a facsimile function, or a printing function.

As illustrated in FIG. 1, the image forming apparatus 100 includes a controller 10, an output mechanism 20, and an operating unit 30. Although the image forming apparatus 100 illustrated in FIG. 1 is of a tandem type, the image forming apparatus 100 may be of a rotary type.

The output mechanism 20 includes a light-emitting diode (LED) printing head (LPH) 21, a cleaning blade 22, a charging device 23, a secondary transfer device 24, a photoreceptor drum 25, a first transfer device 26, a developing device 27, a fixing device 28, and a dispenser 29. The output mechanism 20 may be called, for example, a printer unit, an image forming unit, or an engine. The operation of the individual devices provided in the output mechanism 20 is controlled by the controller 10.

In FIG. 1, the dispenser 29 is also arranged for each of magenta, cyan, and black. However, dispensers 29 for colors other than yellow are not illustrated in FIG. 1. In addition, toner cartridge receivers 36, which are connected to the dispensers 29, and toner cartridges 35 for the colors other than yellow are not illustrated in FIG. 1. In the description provided below, a configuration for yellow will be explained as an example.

The LPH 21 includes an LED array, a driving integrated circuit (IC), and a rod lens array. The LPH 21 causes a large number of LEDs to emit light to expose a surface of the photoreceptor drum 25, under the exposure amount control of the controller 10.

The charging device 23 includes, for example, a conductive elastic roller. The charging device 23 electrically charges the surface of the photoreceptor drum 25 under the potential control of the controller 10. More specifically, when the charging device 23 is made in touch with the photoreceptor drum 25 and voltage is applied, the polarity of the photoreceptor drum 25 becomes positive and is thus electrically charged.

The photoreceptor drum 25 includes a column made of aluminum. The surface of the photoreceptor drum 25 includes a layer of an optical semiconductor (for example, made of a-Si (amorphous silicon)). The photoreceptor drum 25 rotates (in FIG. 1, rotates to the left) around the center of the upper surface (or lower surface), under the control of the controller 10. As described above, the photoreceptor drum 25 is electrically charged by the charging device 23. When the LPH 21 emits light, a scanned portion of the photoreceptor drum 25 is discharged. Then, toner supplied from the developing device 27, which will be described later, is adhered to the photoreceptor drum 25. Accordingly, the photoreceptor drum 25 holds a toner image generated on the basis of image information.

The first transfer device 26 performs first transfer of a toner image, which is adhered to the photoreceptor drum 25, to an intermediate transfer body 40. The first transfer device 26 positively charges the intermediate transfer body 40, under the transfer potential control of the controller 10. Accordingly, toner of a negative potential adhered to the photoreceptor drum 25 is transferred to the intermediate transfer body 40. Since the first transfer device 26 rotates (in FIG. 1, rotates to the right) so as to move in the same direction as the direction in which the photoreceptor drum 25 moves, the intermediate transfer body 40 is pushed to a direction represented by an arrow in FIG. 1. When toner remains in the photoreceptor drum 25 after first transfer is performed, the toner is removed by the cleaning blade 22, which is in contact with the photoreceptor drum 25.

The developing device 27 includes a cylinder made of aluminum. The cylinder includes a magnetic roller (hereinafter, referred to as a developing roller). Toner is supplied from the toner cartridge 35 via the dispenser 29 to the developing device 27. The toner cartridge 35 is installed in the toner cartridge receiver 36 in a removable manner. The supplied toner is stirred with metallic carriers and is negatively charged. Powder, such as the toner and carriers mentioned above, to be used for developing is called developer. The magnetic force of the magnetic roller causes the developer to have the shape of a magnetic brush on the developing roller, and the developer is made in contact with the photoreceptor drum 25. Then, under the potential control of the controller 10 for the developing device 27, the toner on the developing roller is developed on the photoreceptor drum 25. Accordingly, a toner image is formed on the photoreceptor drum 25, and first transfer of the toner image to the intermediate transfer body 40 is performed.

As described above, first transfer of toner images of magenta, cyan, and black as well as a toner image of yellow to the intermediate transfer body 40 is performed. The toner images of the individual colors are individually formed or formed in an overlapping manner. When toner images overlap, the intermediate transfer body 40 is driven. For example, first transfer of toner images of magenta and cyan is performed to a portion where first transfer of a toner image of yellow is performed, and a color image is formed.

The intermediate transfer body 40 is kept driven even after first transfer of a toner image is performed. The portion where first transfer is performed reaches the secondary transfer device 24. The secondary transfer device 24 performs secondary transfer of the toner image, for which first transfer to the intermediate transfer body 40 has been performed, to a recording sheet S.

The secondary transfer device 24 positively charges the recording paper S, under the transfer potential control of the controller 10. Accordingly, a toner image of the negative potential adhered to the intermediate transfer body 40 is absorbed into the recording sheet S. The toner image absorbed into the recording sheet S is fixed to the recording sheet S by the fixing device 28. The recording sheet S to which the toner image is fixed is ejected outside the image forming apparatus 100.

The operating unit 30 includes physical operation buttons and a physical operation panel. The operating unit 30 displays operation contents to be operated by a user, under the display control of the controller 10. The operation contents include, for example, operation guidance, images of selection buttons to be selected by the user, and the like. The user operates a selection button to enter setting contents to be set for the image forming apparatus 100. The entered setting contents are registered to the image forming apparatus 100. The setting contents include, for example, function settings, such as copying density and magnification for copying, the type of printing paper for printing, and the like, as well as the destination of facsimile transmission (facsimile recipient). The setting contents appear as report items, as described below. When a selection button or an operation button is operated, an instruction is given to the controller 10.

The configuration of the controller 10 described above will now be explained with reference to FIG. 2.

Figure 2:
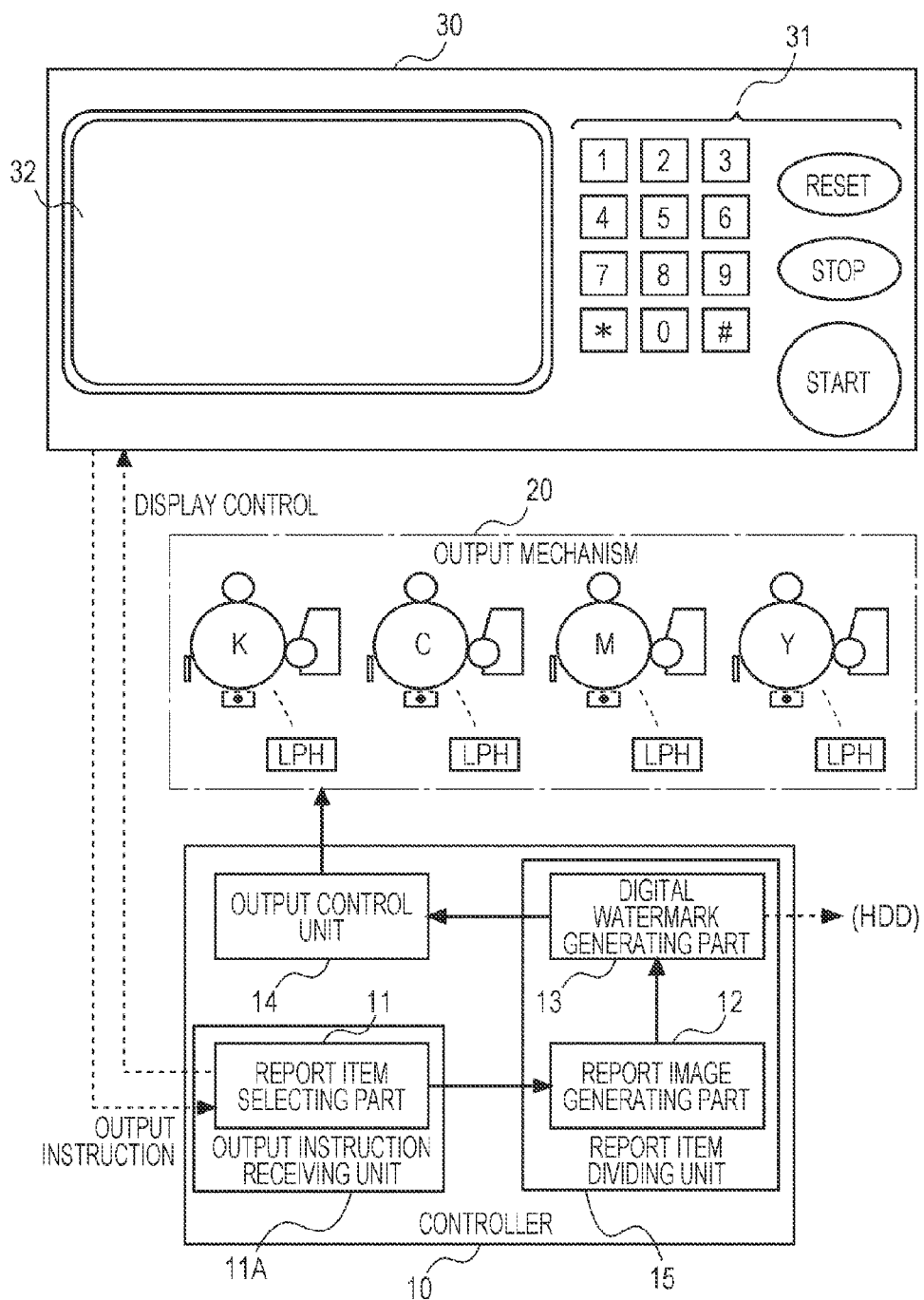
FIG. 2 illustrates an example of a functional block diagram of a controller.

FIG. 2 illustrates an example of a functional block diagram of the controller 10.

As illustrated in FIG. 2, the controller 10 includes an output instruction receiving unit 11A, a report item dividing unit 15, and an output control unit 14. The output instruction receiving unit 11A includes a report item selecting part 11. The report item dividing unit 15 includes a report image generating part 12 and a digital watermark generating part 13.

The output instruction receiving unit 11A receives an output instruction for a report. The output instruction is output from the operating unit 30, for example, when a user presses operation buttons 31 or performs an operation for an operation panel 32. In the case where an information terminal (for example, a personal computer (PC) or a tablet-type computer), which is not illustrated, is connected to the image forming apparatus 100, the output instruction receiving unit 11A may receive an output instruction from the information terminal.

In the case where an output instruction for a report is received and report items to be output are spread over plural sheets or plural pages, the report item selecting part 11 allows a user to select whether or not to output the report in such a manner the report items are formed within a predetermined number of recording sheets or a predetermined number of pages.

Here, the number of sheets represents the number of recording sheets, and the number of pages represents the number of images to be printed on recording sheets. For example, when the number of pages of image information is three and an instruction for double-sided printing is not given in a print job, the image on the first page is printed on a first side of the first recording sheet, the image on the second page is printed on a first side of the second recording sheet, and the image on the third page is printed on a first side of the third recording sheet. Thus, in this case, the number of recording sheets is three. When the number of pages of image information is three and an instruction for double-sided printing is given in a print job, the image on the first page and the image on the second page are printed on first and second sides of the first recording sheet, and the image on the third page is printed on a first side of the second recording sheet. Thus, in this case, the number of recording sheets is two. When the number of image information is six and an instruction for double-sided printing is given in a print job, the images on the first and second pages are printed on first and second sides of the first recording sheet, the images on the third and fourth pages are printed on first and second sides of the second recording sheet, and the images on the fifth and sixth pages are printed on first and second sides of the third recording sheet. Thus, in this case, the number of recording sheets is three. When the number of pages of image information is ten and an instruction for double-sided printing and an instruction for 2-up printing in which two pages of image information are aggregated into one side of a recording sheet are given in a print job, the number of recording sheets is three.

For example, the number of sheets or the number of pages may be specified in advance by an administrator of the image forming apparatus 100, may be specified in advance by a user at the time of output of a report, or may be designed in advance by a designer. In addition, for example, the number of sheets or the number of pages may be specified as one sheet or one page, may be specified as a number of sheets or a number of pages that is different from a number of sheets or a number of pages over which report items are spread, or may be specified as a number of sheets or less or a number of pages or less. For example, when the number of predetermined recording sheets is specified to one, the report item selecting part 11 displays on the operation panel 32 a question as to whether or not to output a report in such a manner that report items are formed within one page. When a user selects that the report should be output in such a manner that the report items are formed within one page, the report item selecting part 11 also allows the user to select a report item or allows the user to enter the page number of the page that the user wants to output. When receiving a selection instruction from the operation buttons 31 or the operation panel 32, the report item selecting part 11 outputs selected contents to the report image generating part 12.

When an output instruction for a report is received, the report item dividing unit 15 divides report items to be output into report items to be output as characters on a recording sheet (appropriately, referred to as "main-report items") and report items to be output as digital watermarks (appropriately, referred to as "sub-report items") in such a manner that the report items are formed within a predetermined number of recording sheets or a predetermined number of pages. A person who specifies the number of recording sheets or the number of pages, the number of recording sheets or the number of pages to be specified, and the like are as described above.

The report image generating part 12 generates a report image regarding a main-report item generated on the basis of division by the report item dividing unit 15. For example, the report image generating part 12 generates, on the basis of selected contents, report images including report items (main-report items) including characters that fall within one page. For example, report items including characters that fall within one page may be set in advance by design based on a customer's request or the like. When generating a report image, the report image generating part 12 outputs the generated report image to the digital watermark generating part 13. The report image generating part 12 also outputs to the digital watermark generating part 13 report items (sub-report items) other than the main-report items of the report items to be output.

The digital watermark generating part 13 generates, on the basis of a report image and a sub-report item output from the report image generating part 12, a digital watermark of the sub-report item. When it is determined that the digital watermark of the sub-report item falls within one page, the digital watermark generating part 13 generates the digital watermark of the sub-report item. When it is determined that the digital watermark of the sub-report item does not fall within one page, the digital watermark generating part 13 stores report item information on the sub-report item as electronic information in a storing device such as a hard disc drive (HDD), and generates a digital watermark of the place where the report item information is stored. The electronic information may be stored as an image perceptible by a user. The place where report item information is stored is, for example, an internet protocol (IP) address, a uniform resource locater (URL), or the like. When generating a digital watermark, the digital watermark generating part 13 combines the digital watermark with a report image. The digital watermark generating part 13 outputs the report image combined with the digital watermark to the output control unit 14.

The output control unit 14 controls the operation of the output mechanism 20, on the basis of a division result by the report item dividing unit 15. For more detail, the output control unit 14 controls the operation of the output mechanism 20, on the basis of a report image output from the digital watermark generating part 13. Specifically, the output control unit 14 controls the operation of the output mechanism 20 to form a report image on a recording sheet S, and the report image is output outside the image forming apparatus 100 as a report. Accordingly, a main-report item appears as characters in a report and a sub-report item appears as a digital watermark.

The hardware configuration of the image forming apparatus 100 will now be described with reference to FIG. 3.

Figure 3:
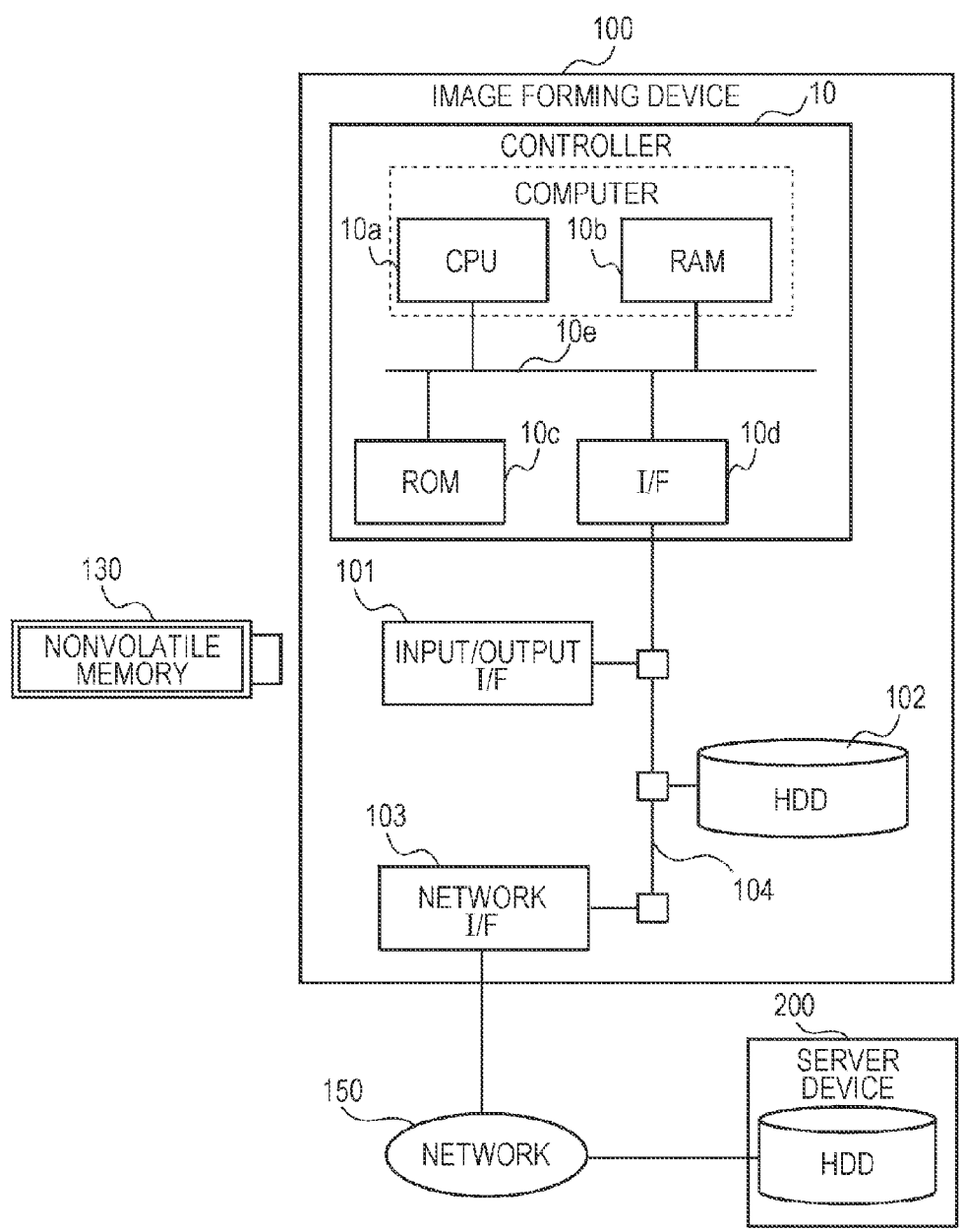
FIG. 3 is a block diagram exemplifying the hardware configuration of the image forming apparatus.

FIG. 3 is a block diagram exemplifying the hardware configuration of the image forming apparatus 100.

As illustrated in FIG. 3, the image forming apparatus 100 includes the controller 10, an input/output interface (I/F) 101, an HDD 102, and a network I/F 103. The controller 10, the input/output I/F 101, the HDD 102, and the network I/F 103 are connected to each other via a bus 104.

The controller 10 includes a central processing unit (CPU) 10*a*, a random access memory (RAM) 10*b*, a read only memory (ROM) 10*c*, and an I/F 10*d*. The CPU 10*a*, the RAM 10*b*, the ROM 10*c*, and the I/F 10*d* are connected to each other via a bus 10*e*. A computer according to an exemplary embodiment of the invention is implemented by the CPU 10*a* and the RAM 10*b*.

The input/output I/F 101 includes, for example, a universal serial bus (USB) port. A portable storing medium, that is, for example, a nonvolatile memory 130 such as a flash memory, is connected to the input/output I/F 101. Thus, a program may be stored in the nonvolatile memory 130, and the program may be stored in the HDD 102 via the input/output I/F 101.

The HDD 102 stores a program and various types of information. The various types of information include information on setting contents set for the image forming apparatus 100 and an image of the above-described sub-report item information.

The network I/F 103 includes, for example, a local area network (LAN) port. For example, one end of a LAN cable is connected to the network I/F 103. A server device 200 including an HDD is connected to the other end of the LAN cable. As illustrated in FIG. 3, the server device 200 is installed outside the image forming apparatus 100.

For example, communication apparatuses, such as a switch and a router, and a network 105 that connects the communication apparatuses via various cables may be arranged between the network I/F 103 and the server device 200. The LAN may be a wired or wireless LAN. The Internet may be used instead of a LAN or together with a LAN. The controller 10 may store an image of the above-described sub-report item information into the HDD of the server device 200.

As described above, in the above-described computer, when the RAM 10*b* reads a program stored in the ROM 10*c* or the HDD 102 and the CPU 10*a* executes the read program, individual functions of the controller 10 are implemented. The program may be based on a flowchart described below.

The operation of the controller 10 will be described with reference to FIGS. 4 and 5.

Figure 4:
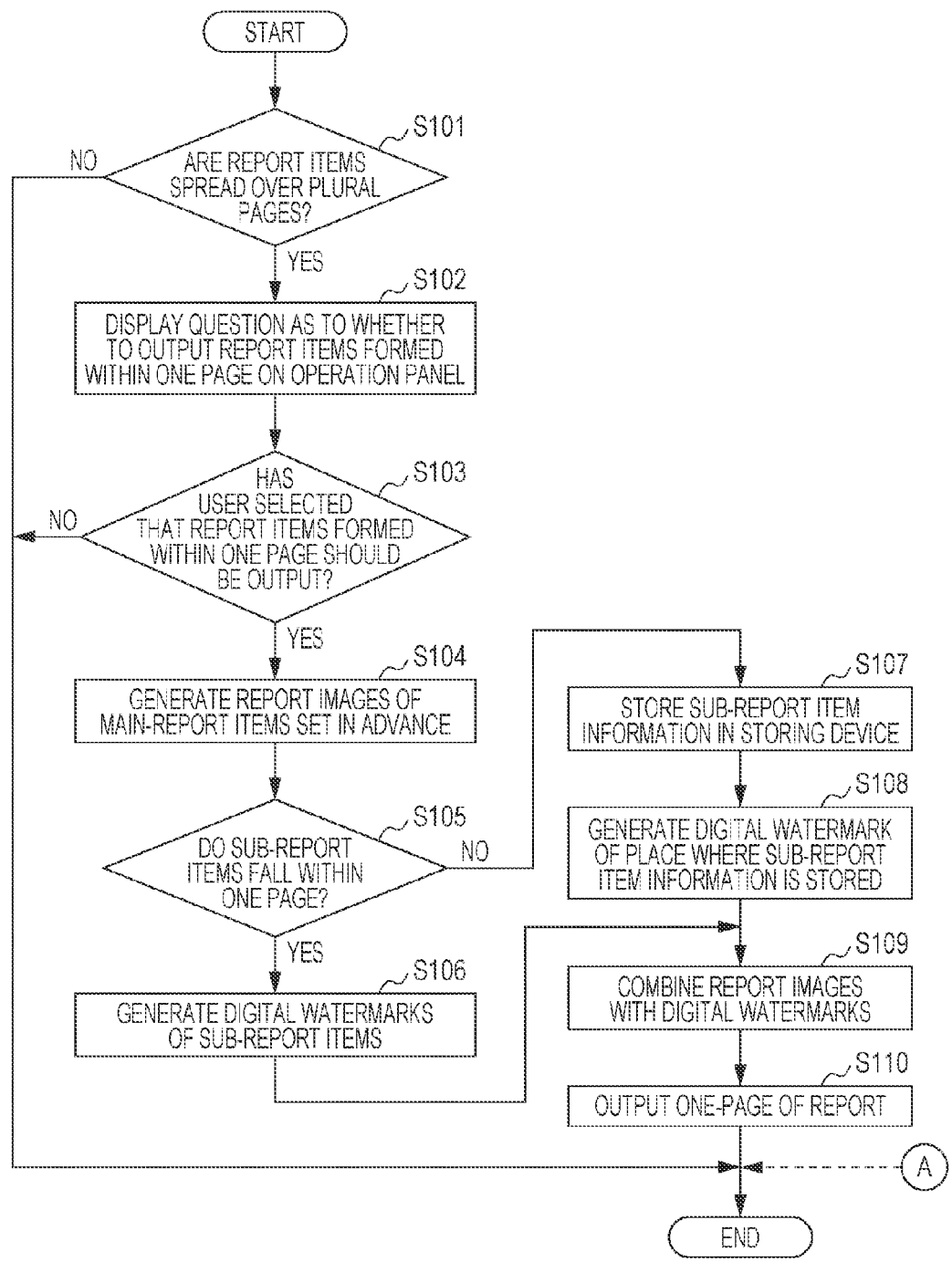
FIG. 4 is a flowchart illustrating an example of the operation of the controller.

FIG. 4 is a flowchart illustrating an example of a process performed by the controller 10. FIG. 5 illustrates an example of an operation screen displayed on the operation panel 32. The process represented by the flowchart illustrated in FIG. 4 starts when a user presses a start button, which is one of the operation buttons 31, and the controller 10 receives from the operating unit 30 an instruction to output a report.

The report item selecting part 11 determines whether or not report items are spread over plural pages (step S101). When the report item selecting part 11 determines that the report items are not spread over plural pages (NO in step S101), only a one-page report is output and it seems to be easy for a user to read the report items that are formed within one page. Thus, the process ends.

When the report item selecting part 11 determines that the report items are spread over plural pages (YES in step S101), the report item selecting part 11 displays on the operation panel 32 a question as to whether or not to output a report in such a manner that the report items are formed within one page (step S102). For example, as illustrated in FIG. 5, the report item selecting part 11 displays on the operation panel 32 an operation guidance asking whether or not to output the report in such a manner that the report items are formed within one page and images of selection buttons "YES" and "NO".

The report item selecting part 11 determines whether or not the user has selected that the report should be output in such a manner that the report items are formed within one page (step S103). For example, when the selection button "NO" on the operation panel 32 is selected, the report item selecting part 11 determines that the user has not selected that the report should be output in such a manner that the report items are formed within one page (NO in step S103). Then, the process ends. That is, even when report items are spread over plural pages, if a user wants to output a report in such a manner that the report items are formed over plural pages, the report in which the report items are formed over plural pages is output.

When the selection button "YES" on the operation panel 32 is selected, the report item selecting part 11 determines that the user has selected that the report should be output in such a manner that the report items are formed within one page (YES in step S103). Then, the report image generating part 12 generates report images of main-report items set in advance (step S104).

After the processing of step S104 ends, the digital watermark generating part 13 determines whether or not sub-report items fall within one page (step S105). More specifically, the digital watermark generating part 13 determines whether or not the amount of information of the sub-report items is capable of being embedded in digital watermarks for one page. For example, the digital watermark generating part 13 may determine whether or not sub-report items fall within one recording sheet, spread over plural pages, or spread over plural pages. When the digital watermark generating part 13 determines that the sub-report items fall within one page (YES in step S105), the digital watermark generating part 13 generates digital watermarks for the sub-report items (step S106). When the digital watermark generating part 13 determines that sub-report items do not fall within one page (NO in step S105), the digital watermark generating part 13 stores sub-report item information on the sub-report items in a storing device (step S107). The storing device may be arranged inside the image forming apparatus 100 or outside the image forming apparatus 100. After the processing of step S107 ends, the digital watermark generating part 13 generates a digital watermark of the place where the sub-report item information is stored (step S108).

After the processing of step S106 or step S108 ends, the digital watermark generating part 13 combines the generated report images with the generated digital watermarks (step S109). After the processing of step S109 ends, the output control unit 14 controls the operation of the output mechanism 20 to output a one-page report (step S110). Processing "A" illustrated in FIG. 4 will be explained below in a second exemplary embodiment.

A specific example of a report output in the first exemplary embodiment will now be described with reference to FIGS. 6A to 6C and FIGS. 7A to 7C.

Figure 7A:
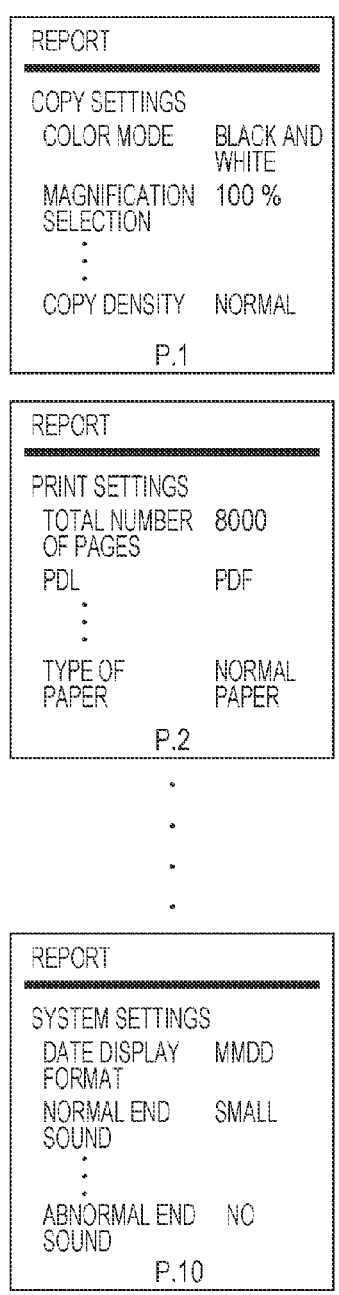
FIGS. 7A to 7C are diagrams for explaining a report output in the case where sub-report items do not fall within one page.
Figure 7B:
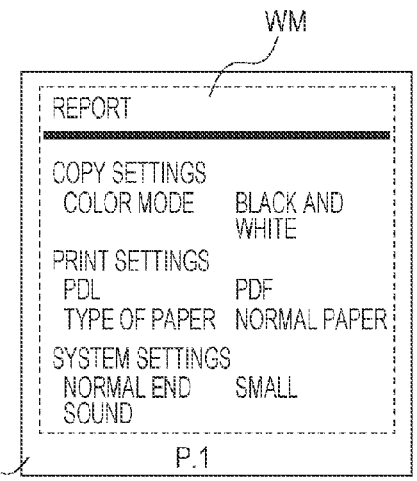
Figure 7C:
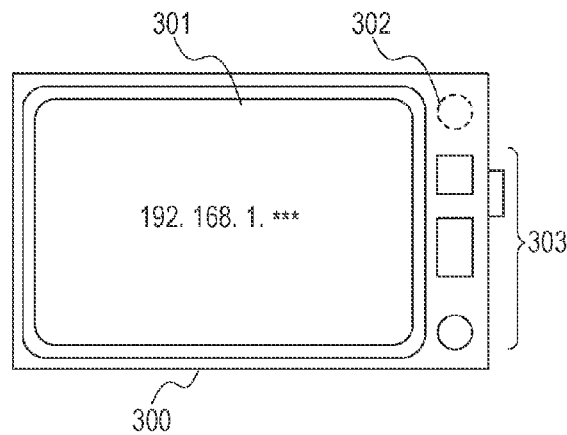

FIGS. 6A to 6C are diagrams for explaining a report output in the case where sub-report items fall within one page. FIGS. 7A to 7C are diagrams for explaining a report output in the case where sub-report items do not fall within one page. In FIG. 6A and FIG. 7A, the third to ninth pages of the report are omitted.

In FIG. 6A and FIG. 7A, report items are spread over plural pages. For example, the title of a report item "copy settings" is printed in the first page of the report. In addition, as detailed report items, "color mode: black and white", "magnification selection: 100%", . . . , and "copy density: normal" are printed. Similarly, the title of a report item "print settings" is printed in the second page of the report. In addition, as detailed report items, "total number of pages: 8000", "PDL: PDF", . . . , and "type of paper: normal paper" are printed. The title of a report item "system settings" is printed in the tenth page of the report. In addition, as detailed report items, "date display format: MMDD", "normal end sound: small", . . . , and "abnormal end sound: no" are printed.

As described above, in the case where report items are spread over plural pages, when the user selects, on the operation panel 32, that a report should be output in such a manner that the report items are formed within one page, a report is output in such a manner that report items set in advance (main-report items) are printed on a recording sheet S and report items (sub-report items) other than the report items set in advance are printed as digital watermarks WM on the same page as the report items set in advance, as illustrated in FIG. 6B and FIG. 7B. For example, when report items "color mode: black and white", "PDL: PDF", "type of paper: normal paper", and "normal end sound: small" are set in advance as main-report items, these report items are printed in one page, as illustrated in FIG. 6B and FIG. 7B.

In addition, in FIG. 6B and FIG. 7B, digital watermarks WM appear in the background of the sheet as fine dots in a color lighter than the color of characters. On the basis of big and small plural dots printed in spaces between characters and spaces inside characters, information on sub-report items and the like are expressed. For example, information is expressed on the basis of the distance between dots and the distance between a dot and a character. Thus, digital watermarks WM are not perceptible by a user. Instead of the dots described above, fine oblique lines having different thicknesses as well as dots may be used.

As illustrated in FIG. 6C and FIG. 7C, the sub-report items are perceptible by a user with a portable information terminal 300. The portable information terminal 300 includes a display unit 301 (for example, a liquid crystal display), an imaging unit 302 (for example, a camera), and an operating unit 303. When the position of the portable information terminal 300 is set in such a manner that digital watermarks WM are located within an imaging area of the imaging unit 302 and the user operates the operating unit 303, the imaging unit 302 captures images of the digital watermarks WM. The captured images of the digital watermarks WM are analyzed in accordance with an analysis program for analyzing digital watermarks, which is stored in the portable information terminal 300. An analysis result is displayed on the display unit 301.

For example, when the amount of information of sub-report items is capable of being embedded in digital watermarks WM for one page, sub-report items, "magnification: 100%", "total number of pages: 8000", "date display format: MMDD", and "abnormal end sound: no", are displayed on the display unit 301, as illustrated in FIG. 6C. Accordingly, the user is able to check the sub-report items, using the portable information terminal 300. When the amount of information of sub-report items is not capable of being embedded in digital watermarks WM for one page, the place where sub-report item information, which represents sub-report items in the form of images, is stored is displayed on the display unit 301. For example, as illustrated in FIG. 7C, an IP address "192.168.1.***" is displayed as the place where sub-report item information is stored. The user is able to check sub-report items by referring to a storing device to which the IP address is allocated. Sub-report item information may be acquired on the basis of the place where sub-report item information is stored, and the acquired sub-report item information may be displayed. Instead of an IP address, an URL may be used.

As described above, in this exemplary embodiment, when report items are spread over plural pages, report items set in advance to be formed within one page are printed as a report, and report items other than the report items set in advance are printed as digital watermarks WM in the same page as the report items set in advance. Thus, a report is output in a form that is easily read by a user. Furthermore, with the use of the portable information terminal 300, report items that are not printed are capable of being checked at any time desired by the user. Thus, compared to the case where a report formed over plural pages is output, the number of recording sheets S is reduced without reducing the amount of information. In particular, when sub-report items are represented graphically and the user checks the sub-report items, the analysis program stored in the portable information terminal 300 may be changed. Thus, compared to the case where a program built in the image forming apparatus 100 is changed, the cost and time required for development are reduced.

Second Exemplary Embodiment

A second exemplary embodiment of the invention will be described with reference to FIG. 8, FIGS. 9A to 9C, FIGS. 10A to 10C, and FIGS. 11A to 11C.

Figure 8:
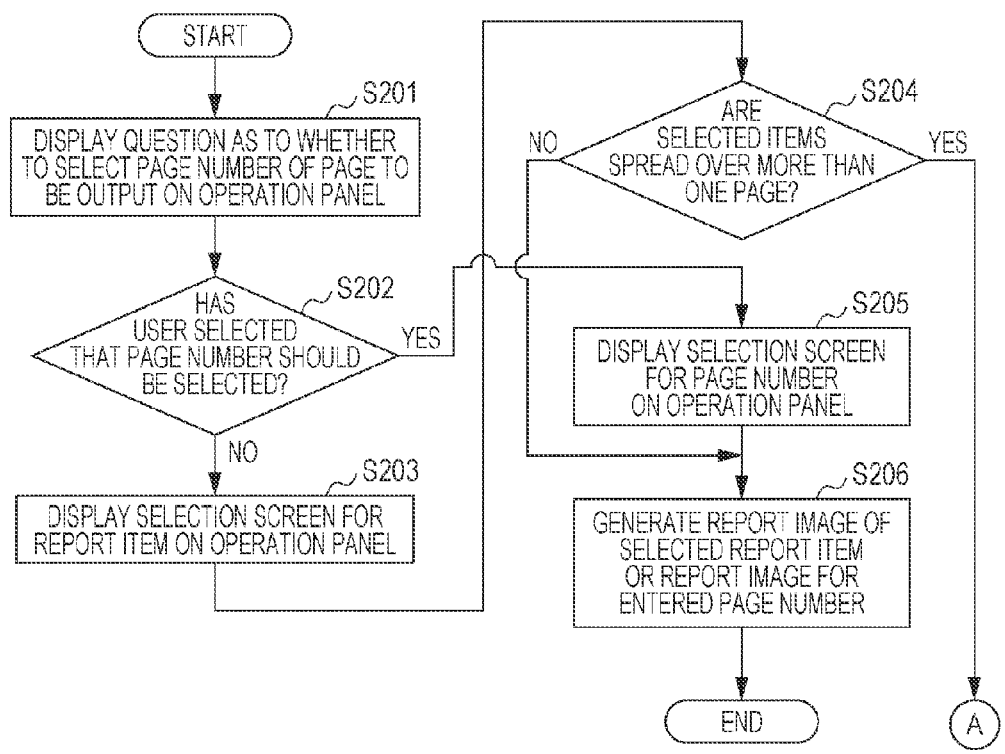
FIG. 8 is a flowchart illustrating another example of the operation of the controller.

FIG. 8 is a flowchart illustrating another example of a process performed by the controller 10. FIG. 9A to 9C illustrate another example of an operation screen displayed on the operation panel 32. The flowchart illustrated in FIG. 8 is replaced with the processing of step S104 illustrated in FIG. 4.

After the processing of step S103 illustrated in the flowchart of FIG. 4 explained in the first exemplary embodiment ends, the report item selecting part 11 displays on the operation panel 32 a question as to whether or not to select the page number of a page to be output (step S201), as illustrated in FIG. 8. For example, as illustrated in FIG. 9A, the report item selecting part 11 displays on the operation panel 32 an operation guidance asking whether or not to select the page number of a page to be output and images of selection buttons "YES" and "NO".

Then, the report item selecting part 11 determines whether or not the user has selected that the page number of a page to be output should be selected (step S202). For example, when the selection button "NO" on the operation panel 32 is selected, the report item selecting part 11 determines that the user has not selected that the page number of a page to be output should be selected (NO in step S202), and displays a selection screen for a report item on the operation panel 32, as illustrated in FIG. 9B (step S203). The user selects in advance at least one report item displayed on the operation panel 32. The selected at least one report item is printed as a main-report item on the recording sheet S.

After the processing of step S203 ends, the report item selecting part 11 determines whether or not the selected at least one report item is spread over more than one page (step S204). When the report item selecting part 11 determines that the selected at least one report item is spread over more than one page (YES in step S204), the process proceeds to the processing "A". The processing "A" is linked with the processing "A" illustrated in FIG. 4. Thus, the report item selecting part 11 terminates the process. Accordingly, a problem in that the user selects too many report items and a report in which the report items are formed over plural pages is output is avoided.

When the selection button "YES" on the operation panel 32 is selected in step S202, the report item selecting part 11 determines that the user has selected that the page number of a page to be output should be selected (YES in step S202), and displays a selection screen for a page number on the operation panel 32, as illustrated in FIG. 9C (step S205). The user selects in advance an image of an enter button displayed on the operation panel 32. For example, in the example of FIG. 9C, the number "8" is selected as the page number of a page to be output. Report items set in advance for the selected page number are printed as main-report items on the recording sheet S.

When it is determined that the selected at least one report item falls within one page in the processing of step S204 (NO in step S204) or after the processing of step S205 ends, the report image generating part 12 generates a report image of the selected report item or a report image for the entered page number (step S206). After the processing of step S206 ends, the processing of step S105 and the subsequent processing illustrated in FIG. 4 start. Thus, report items (sub-report items) other than the selected at least one report item (main-report item) or report items (sub-report items) other than report items (main-report items) set in advance to appear on the page of the entered page number are printed as digital watermarks WM on a recording sheet S.

A specific example of a report output in the second exemplary embodiment will be described by comparing FIGS. 10A to 10C with FIGS. 11A to 11C.

Figure 10A:
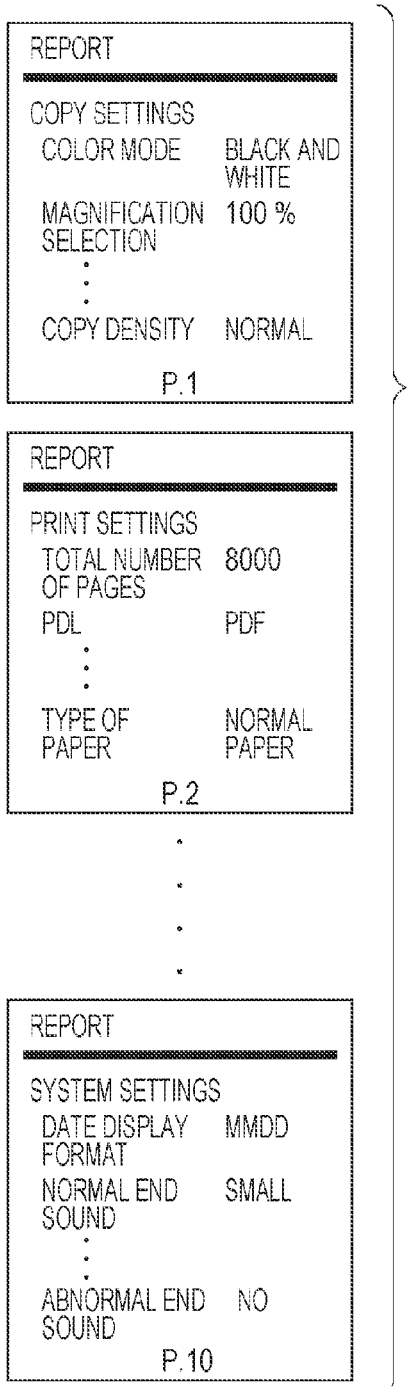
FIGS. 10A to 10C are diagrams for explaining a report output in a comparative example.
Figure 10B:
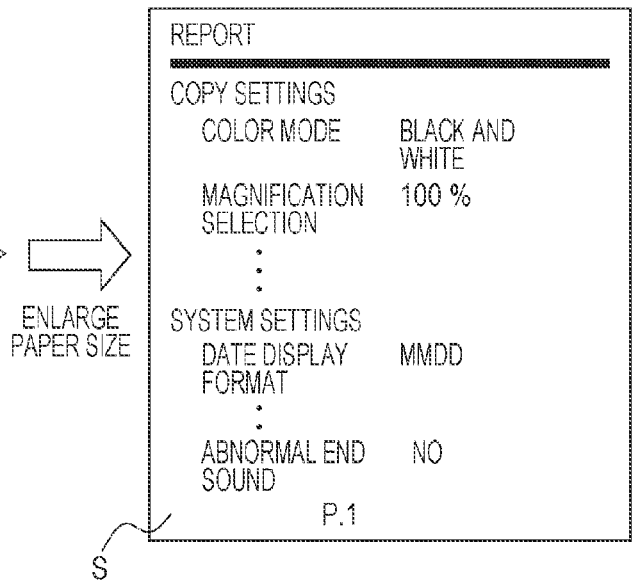
Figure 10C:
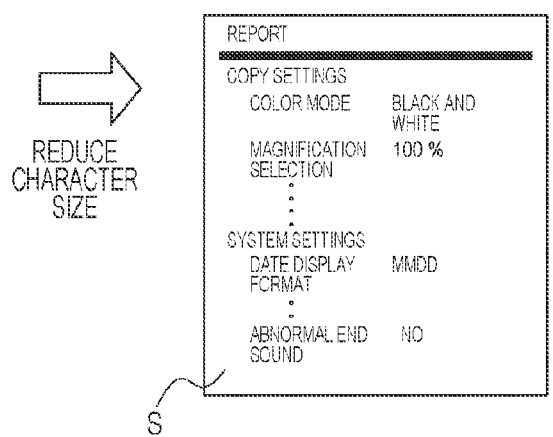

FIGS. 10A to 10C are diagrams for explaining a report output in a comparative example. FIGS. 11A to 11C are diagrams for explaining a report output in the second exemplary embodiment. In FIG. 10A and FIG. 11A, the third to ninth pages of the report are omitted.

In the comparative example illustrated in FIGS. 10A to 10C, as illustrated in FIG. 10A, report items are spread over plural pages. For example, if the paper size of a recording sheet S is increased from the paper size of a recording sheet S that should originally be output and all the report items spread over plural pages are printed on a one-page recording sheet S, the paper size of the recording sheet S differs from the paper size of the recording sheet S that should originally be output, as illustrated in FIG. 10B. Thus, for example, when reports are bound into a file or a folder, the reports, which have different sizes, are filed. Thus, bounding reports having different sizes into a file is not suitable for management of reports.

In addition, as illustrated in FIG. 10C, for example, if the size of characters is reduced without increasing the paper size of a recording sheet S from the paper size of the recording sheet S that should originally be output and all the report items spread over plural pages are printed on a one-page recording sheet S, it is difficult for a user to read the report items. Thus, it is difficult for the user to find a report item that the user wants to check.

In the second exemplary embodiment illustrated in FIGS. 11A to 11C, report items are spread over plural pages, as illustrated in FIG. 11A. When report items are selected by a user, the selected report items are printed on a recording sheet S and non-selected report items are printed as digital watermarks WM on the same page as the selected report items, as illustrated in FIG. 11B. In FIG. 11B, report items "copy density: normal", "PDL: PDF", "type of paper: normal paper", and "abnormal end sound: no" are printed. Thus, it is clear that "copy density", "PDL", "type of paper", and "abnormal end sound" are selected as report items on the operation panel 32. As described also in the first exemplary embodiment, images of digital watermarks WM are captured with the portable information terminal 300, and a user is able to check sub-report items associated with the digital watermarks WM.

Furthermore, when a page number is entered by the user, report items set in advance for the page number are printed, and report items set in advance for page numbers other than the entered page number are printed as digital watermarks WM on the same page as the report items set in advance for the entered page number, as illustrated in FIG. 11C. In FIG. 11C, report items "port activation", "domain restriction", . . . , and "port number" set for the entered page number "8" and setting contents for these report items are printed as report items. Images of digital watermarks WM are captured with the portable information terminal 300, and the user is able to check the sub-report items associated with the digital watermarks WM.

Unlike the comparative example illustrated in FIGS. 10A to 10C, neither the size of paper nor the size of characters is changed in the second exemplary embodiment. This is because the output control unit 14 outputs a report in such a manner that the paper size of a recording sheet S set in the case where a user has selected that a report should be output in such a manner that the report items are formed within one page is the same as the paper size of a recording sheet S set in the case where the user has not selected that a report should be output in such a manner that the report items are formed within one page. Furthermore, the output control unit 14 outputs a report in such a manner that the size of characters of report items set in the case where the user has selected that a report should be output in such a manner that the report items are formed within one page is the same as the size of characters of report items set in the case where the user has not selected that a report should be output in such a manner that the report items are formed within one page. That is, unlike the comparative example, all the report items are not made to appear by forcibly increasing the paper size without changing the size of characters or all the report items are not made to appear by extremely reducing the size of characters without changing the paper size in the second exemplary embodiment. In the second exemplary embodiment, the paper size of a report is not changed, a main-report item appears on a recording sheet S without reducing the size of characters, and a sub-report item appears as a digital watermark WM on the same recording sheet S as the main-report item.

Thus, unlike the comparative example, reports having different sizes are not bound into a file. Furthermore, unlike the comparative example, it is not difficult for a user to read report items, and a report is output in a form that is easy for the user to read. Furthermore, since a sub-report item is represented as a digital watermark WM, the amount of information is not reduced. If there is a space in a recording sheet S, the size of characters may be increased. That is, the size of characters may be the same size as the original or more. Accordingly, compared to the case where the size of characters is the same as the original, it is easier for a user to read report items.

The exemplary embodiments of the invention have been described above. However, the present invention is not limited to specific exemplary embodiments of the invention, and various modifications and changes may be made to the invention without departing from the gist of the invention described in claims. For example, a program according to an exemplary embodiment of the invention may be stored in a recording medium, such as a compact disc read only memory (CD-ROM), and provided from the recording medium, as well as being provided by a communication unit.

In addition, for example, although a digital watermark WM is analyzed by the portable information terminal 300 in the first and second exemplary embodiments described above, for example, a sub-report item may be understood by reading the digital watermark WM using a scanner function provided in the image forming apparatus 100 and analyzing a read result.

Furthermore, security information requiring a password as well as a sub-report item may be embedded in a digital watermark WM. A digital watermark WM in which security information is embedded is checked by a person who has an authority to check the sub-report item. This person is able to check the sub-report item by operating the operating unit 303 of the portable information terminal 300 and entering a password. For example, when a sub-report item contains private information, security information may be embedded in a digital watermark WM.

Furthermore, in the first and second exemplary embodiments described above, a sub-report item is embedded in a digital watermark WM. However, if further information is to be embedded in a digital watermark WM, a main-report item as well as a sub-report item may be embedded.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   a receiving unit that receives an output instruction for a report;
   a dividing unit that divides, when the output instruction for the report is received, report items to be output into a main-report item to be output as characters on a recording sheet and a sub-report item to be output as a digital watermark on the recording sheet in such a manner that the report items to be output are formed within a predetermined number of recording sheets or a predetermined number of pages; and an output controller that causes an output mechanism to output the main-report item as characters on the recording sheet and output the sub-report item as a digital watermark on the recording sheet, based on a division result by the dividing unit, wherein when it is determined that the amount of information of the sub-report item does not fall within the digital watermark for the predetermined number of recording sheets or the predetermined number of pages, the output controller stores sub-report item information on the sub-report item into a storing device and causes the output mechanism to output as a digital watermark a place where the sub-report item information is stored on the recording sheet.

2. The image forming apparatus according to claim 1,
wherein the receiving unit includes a selecting part that allows a user to select, when the receiving unit receives the output instruction for the report, whether or not to output the report in such a manner that the report items to be output are formed within the predetermined number of recording sheets or the predetermined number of pages.

3. The image forming apparatus according to claim 2,
wherein when the output instruction for the report is received and the report items to be output are spread over a plurality of sheets or a plurality of pages, the selecting part allows the user to select whether or not to output the report in such a manner that the report items to be output are formed within the predetermined number of recording sheets or the predetermined number of pages.

4. The image forming apparatus according to claim 2,
wherein when the user selects that the report should be output in such a manner that the report items to be output are formed within the predetermined number of recording sheets or the predetermined number of pages, the selecting part allows the user to select the main-report item, and wherein the output controller causes the selected main-report item to be output as characters.

5. The image forming apparatus according to claim 2,
wherein when the user selects that the report should be output in such a manner that the report items to be output are formed within the predetermined number of recording sheets or the predetermined number of pages, the selecting part allows the user to enter the page number of a page of the report to be output, and wherein the output controller causes a main-report item for the entered page number to be output as characters.

6. The image forming apparatus according to claim 3,
wherein when the user selects that the report should be output in such a manner that the report items to be output are formed within the predetermined number of recording sheets or the predetermined number of pages, the selecting part allows the user to enter the page number of a page of the report to be output, and wherein the output controller causes a main-report item for the entered page number to be output as characters.

7. The image forming apparatus according to claim 3,
wherein when the user selects that the report should be output in such a manner that the report items to be output are formed within the predetermined number of recording sheets or the predetermined number of pages, the selecting part allows the user to select the main-report item, and wherein the output controller causes the selected main-report item to be output as characters.

8. The image forming apparatus according to claim 4,
wherein when it is determined that the selected main-report item is spread over more than the predetermined number of recording sheets or more than the predetermined number of pages, the output controller causes output processing to be stopped.

9. The image forming apparatus according to claim 7,
wherein when it is determined that the selected main-report item is spread over more than the predetermined number of recording sheets or more than the predetermined number of pages, the output controller causes output processing to be stopped.

10. An image forming apparatus comprising:
a receiving unit that receives an output instruction for a report;
a dividing unit that divides, when the output instruction for the report is received, report items to be output into a main-report item to be output as characters on a recording sheet and a sub-report item to be output as a digital watermark on the recording sheet in such a manner that the report items to be output are formed within a predetermined number of recording sheets or a predetermined number of pages; and an output controller that causes an output mechanism to output the main-report item as characters on the recording sheet and output the sub-report item as a digital watermark on the recording sheet, based on a division result by the dividing unit, wherein the receiving unit includes a selecting part that allows a user to select, when the receiving unit receives the output instruction for the report, whether or not to output the report in such a manner that the report items to be output are formed within the predetermined number of recording sheets or the predetermined number of pages, and wherein when the output instruction for the report is received and the report items to be output are spread over a plurality of sheets or a plurality of pages, the selecting part allows the user to select whether or not to output the report in such a manner that the report items to be output are formed within the predetermined number of recording sheets or the predetermined number of pages.

11. An image forming apparatus comprising:
a receiving unit that receives an output instruction for a report;
a dividing unit that divides, when the output instruction for the report is received, report items to be output into a main-report item to be output as characters on a recording sheet and a sub-report item to be output as a digital watermark on the recording sheet in such a manner that the report items to be output are formed within a predetermined number of recording sheets or a predetermined number of pages; and an output controller that causes an output mechanism to output the main-report item as characters on the recording sheet and output the sub-report item as a digital watermark on the recording sheet, based on a division result by the dividing unit, wherein the receiving unit includes a selecting part that allows a user to select, when the receiving unit receives the output instruction for the report, whether or not to output the report in such a manner that the report items to be output are formed within the predetermined number of recording sheets or the predetermined number of pages, wherein when the user selects that the report should be output in such a manner that the report items to be output are formed within the predetermined number of recording sheets or the predetermined number of pages, the selecting part allows the user to select the main-report item, wherein the output controller causes the selected main-report item to be output as characters, and wherein when it is determined that the selected main-report item is spread over more than the predetermined number of recording sheets or more than the predetermined number of pages, the output controller causes output processing to be stopped.

* * * * *